United States Patent [19]

Lister

[11] Patent Number: 4,616,714

[45] Date of Patent: Oct. 14, 1986

[54] SOIL PERFORATOR

[76] Inventor: Robert W. Lister, 570 Den-Mar Ct., Greensburg, Pa. 15601

[21] Appl. No.: 682,742

[22] Filed: Dec. 17, 1984

[51] Int. Cl.$^4$ .................................................. A01B 45/02
[52] U.S. Cl. ...................................... 172/21; 172/556; 172/350
[58] Field of Search ...................... 172/21, 22, 248, 34, 172/349, 611, 142, 556, 483, 350, 245; 111/6, 7

[56] References Cited

U.S. PATENT DOCUMENTS

| | | | |
|---|---|---|---|
| 830,939 | 9/1906 | Thompson | 172/483 X |
| 876,580 | 1/1908 | Newland | 172/34 |
| 1,162,902 | 12/1915 | Colleys | 172/350 |
| 1,704,986 | 3/1929 | Marcy | 172/21 |
| 1,887,334 | 11/1932 | Spaeth | 172/21 |
| 2,072,331 | 3/1937 | Hanna | 111/6 |
| 2,601,591 | 6/1952 | Colombo | 172/350 |
| 2,864,294 | 12/1958 | Pearson | 172/21 |
| 2,864,298 | 12/1958 | Toland | 172/556 |
| 2,902,098 | 9/1959 | Grunder | 172/21 |
| 2,966,218 | 12/1960 | Johnson | 172/21 |
| 3,008,527 | 11/1961 | Stohlmann | 172/611 X |
| 3,596,450 | 8/1971 | Bowers | 172/21 |
| 3,939,917 | 2/1976 | Reed | 172/21 |
| 3,952,490 | 4/1976 | Brockman | 172/611 |

FOREIGN PATENT DOCUMENTS

| | | | |
|---|---|---|---|
| 441434 | 1/1936 | United Kingdom | 172/22 |
| 913349 | 12/1962 | United Kingdom | 172/21 |

*Primary Examiner*—Richard J. Johnson
*Attorney, Agent, or Firm*—Harvey B. Jacobson

[57] ABSTRACT

A soil perforator comprises a lightweight spiked rotor carried in a wheeled rectangular box-like frame with a handle secured to the rotor for manually pushing the assembled frame and rotor along the ground to provide soil aeration by perforation of the ground by the rotor spikes. The rotor may be vertically adjusted in the frame to vary the degree of spike penetration and to move the spikes out of ground engagement. The perforator further includes a detachable weight box to be mounted at one end of the frame opposite the handle, the weight box providing effective soil penetration by the spikes when the device is hitched by the handle to a vehicle and towed over the ground in the direction opposite to which it is manually pushed. Adjustable spring rake assemblies are provided at the opposite ends of the frame.

12 Claims, 6 Drawing Figures

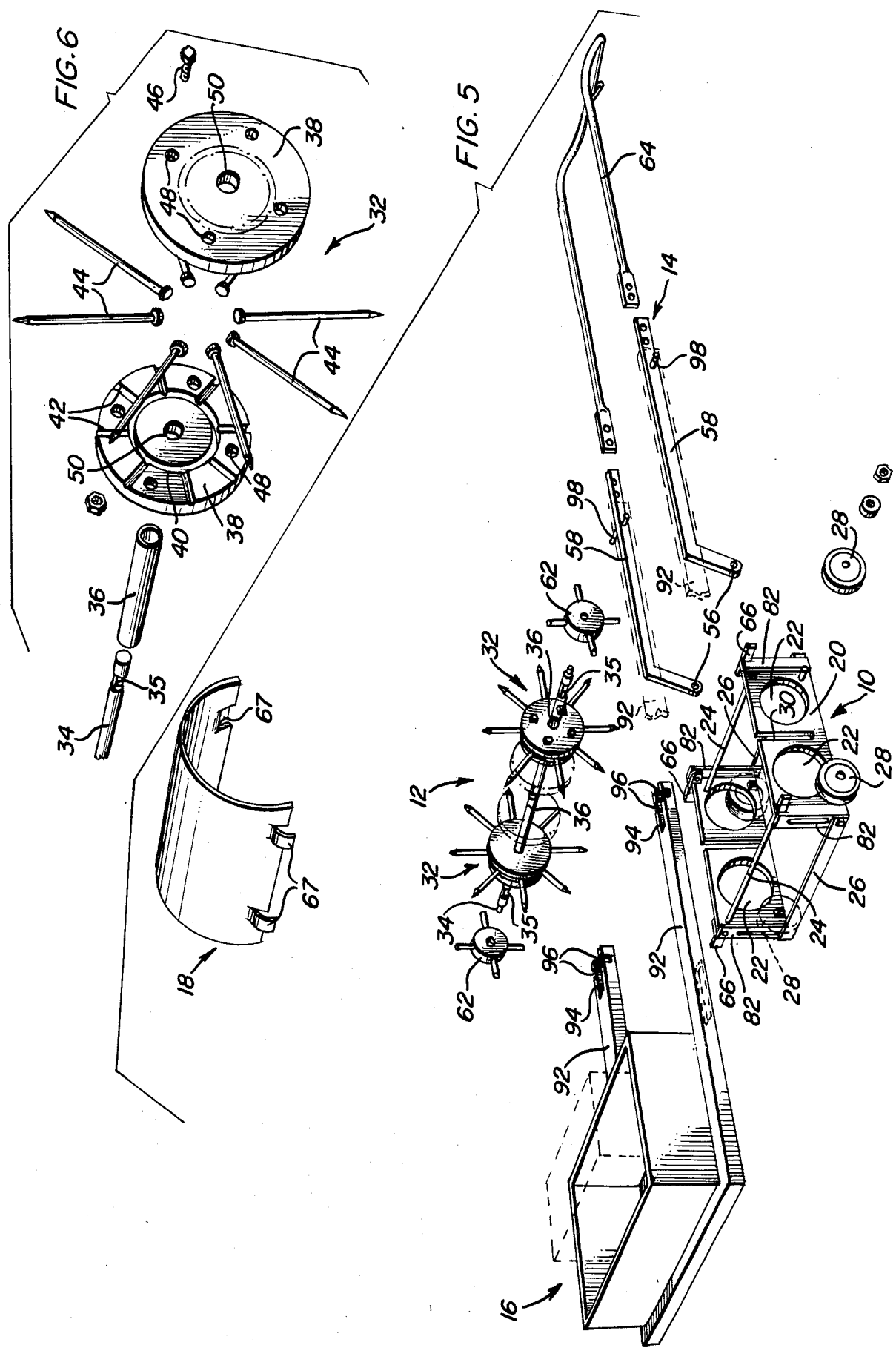

SOIL PERFORATOR

BACKGROUND OF THE INVENTION

This invention relates to a soil perforator for use in penetrating sod with a series of holes to provide ground aeration, for example in lawn care, as a means enabling water or fertilizer to penetrate the soil to below sod depth.

While lawn care equipment has made significant progress in recent years, there is a need for a handy soil perforator which can be owned and used by do-it-yourself lawn care persons, householders and the like, to provide soil improvements. Presently available equipment tends to be cumbersome and is commonly only available on a rental basis. Moreover, known devices typically employ weighted rollers in connection with soil perforating elements which tend to compact the soil in a manner that is counterproductive to soil aeration.

Statement of Prior Art

Applicant is aware of the following U.S. patents, the relevance of which is that they relate to rotary soil perforation devices and the like. None of the patents, however, discloses the features of the present invention.
U.S. Pat. No. 1,704,986, F. E. Marcy, Mar. 12, 1929;
U.S. Pat. No. 1,898,214, D. L. Richards, Feb. 21, 1933;
U.S. Pat. No. 1,965,177, F. X. Finkl, July 3, 1934; U.S. Pat. No. 3,643,746, A. A. Dedoes, Feb. 22, 1972; U.S. Pat. No. 3,794,121, D. A. Drozak, Feb. 26, 1974; U.S. Pat. No. 3,934,390, A. K. S. Ballard, Jan 27, 1976.

SUMMARY OF THE INVENTION

The invention provides a soil perforator having a convenient light-weight construction which lends itself either to be pushed manually over a lawn or bare ground, in a manner similar to the manner of pushing a manual mower, or to being towed behind a vehicle such as a riding mower.

Broadly stated, a soil perforator in accordance with the invention may comprise a lightweight wheeled frame, conveniently of rectangular box-like form, a spiked rotor for mounting on the frame in a manner providing for height adjustment of the rotor so as to allow the degree of penetration of the spikes into the ground to be adjusted or to allow the spikes to be raised clear of the ground for wheeling the device to and from a work site, and a handle assembly for use in manually pushing the assembled frame and rotor or for attaching the assembly to a hitch of a riding mower and the like when it is to be towed.

Additional features of the invention reside in the construction of the spiked rotor including the provision of individual spiked assemblies incorporated therein, the manner in which the rotor and handle are mounted on the frame, the provision of a detachable weight box for use on the frame when it is being towed, and the provision of adjustable spring rake devices at least on one end of the frame.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an exploded perspective view of the soil perforator.
FIG. 6 is an exploded perspective view of a spiked disc assembly for the soil perforator.

DESCRIPTION OF THE PREFERRED EMBODIMENT

Figure 1:
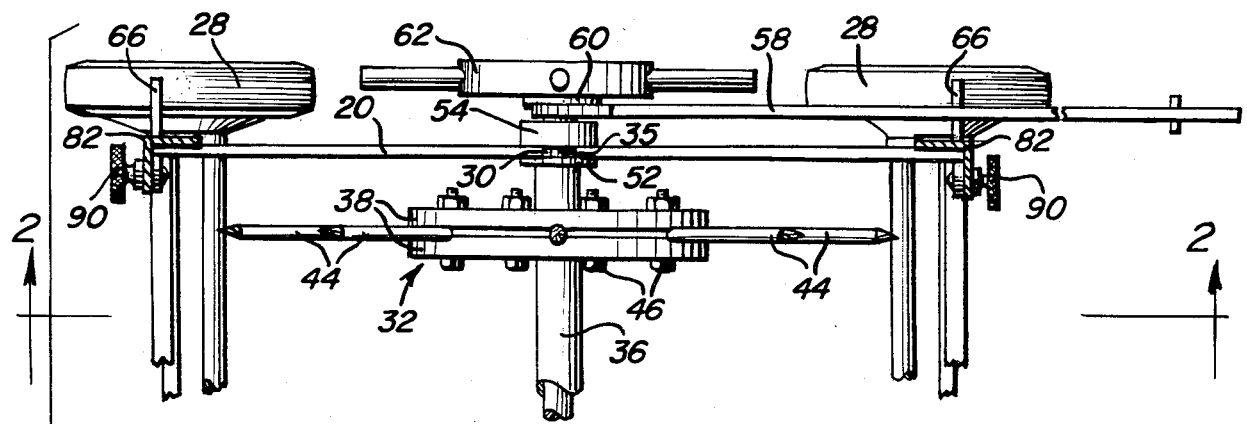
FIG. 1 is a plan view, partly broken away, of a soil perforator in accordance with the invention.

As best seen initially in FIG. 5, a soil perforator in accordance with the invention comprises a wheeled box-like frame 10 of generally rectangular form, a spiked rotor 12, a yoke-like handle 14, a weight box 16 and an arch-shaped removable cover 18.

Frame 10 has side plates 20 which may have openings 22 for weight reduction, the side plates being interconnected by upper transverse rods 24 and lower bars 26. Suitable wheels 28 may be mounted on studs or the like at the respective corners of the frame. Side plates further are provided with top-opening vertical slots 30 for vertically adjustably receiving the rotor 12 as as will be described.

Rotor 12 comprises a plurality of spiked disc assemblies 32 freely rotatably mounted on a shaft 34 between tubular spacers 36 which may also freely rotate on the shaft. Each spike disc assembly (see particularly FIG. 6) comprises a pair of like circular discs 38, the inner surfaces of which are each formed with a circular groove 40 and a series of grooves 42 radiating outwardly from groove 40 to the edge of the respective disc. Headed spikes 44 in the form of nails fit in the grooves 42 with the spike heads received in grooves 40 (which may be deeper than grooves 42) and the discs are assembled by bolt and nut connectors 46 fitting through holes 48 in the respective discs. The discs also have central holes 50 for fitting on shaft 34. The construction of the spiked disc assemblies wherein the individual headed spikes are trapped in grooves between bolt-together discs allows for ready spike replacement, and the number of spiked disc assemblies on shaft 34 can be readily varied to suit the required density of soil perforation across the width of the frame.

The opposite ends of shaft 34 may have reduced portions 35 for fitting in the slots 30 of frame 10 with washers 52 (FIG. 1) fitting between the endmost spacers 36 and plates 20, bushings 54 on the outside of plates 20 for receiving openings 56 in the ends of arms 58 of the handle 14, further washers 60 and hand wheels 62 threaded onto the end of shaft 34 for tightening the rotor in required vertical position in the slots 30. Handle 14 has a yoke portion 64 for bolting onto arms 58 and frame 10 has pivoted latch-type elements 66 on the upper corners of plates 20 which may be swung outwardly as shown in the drawings to provide fulcrum points for the handle arms 58 to facilitate raising of the rotor in slots 30 upon loosening of the hand wheels 62, by pressing down on the yoke 64, for example, when it is required to raise spikes 44 out of ground engagement to wheel the aerator to or from a work site. Cover 18 has upset tabs 67 for releasably clipping the cover onto rods 24.

Figure 2:
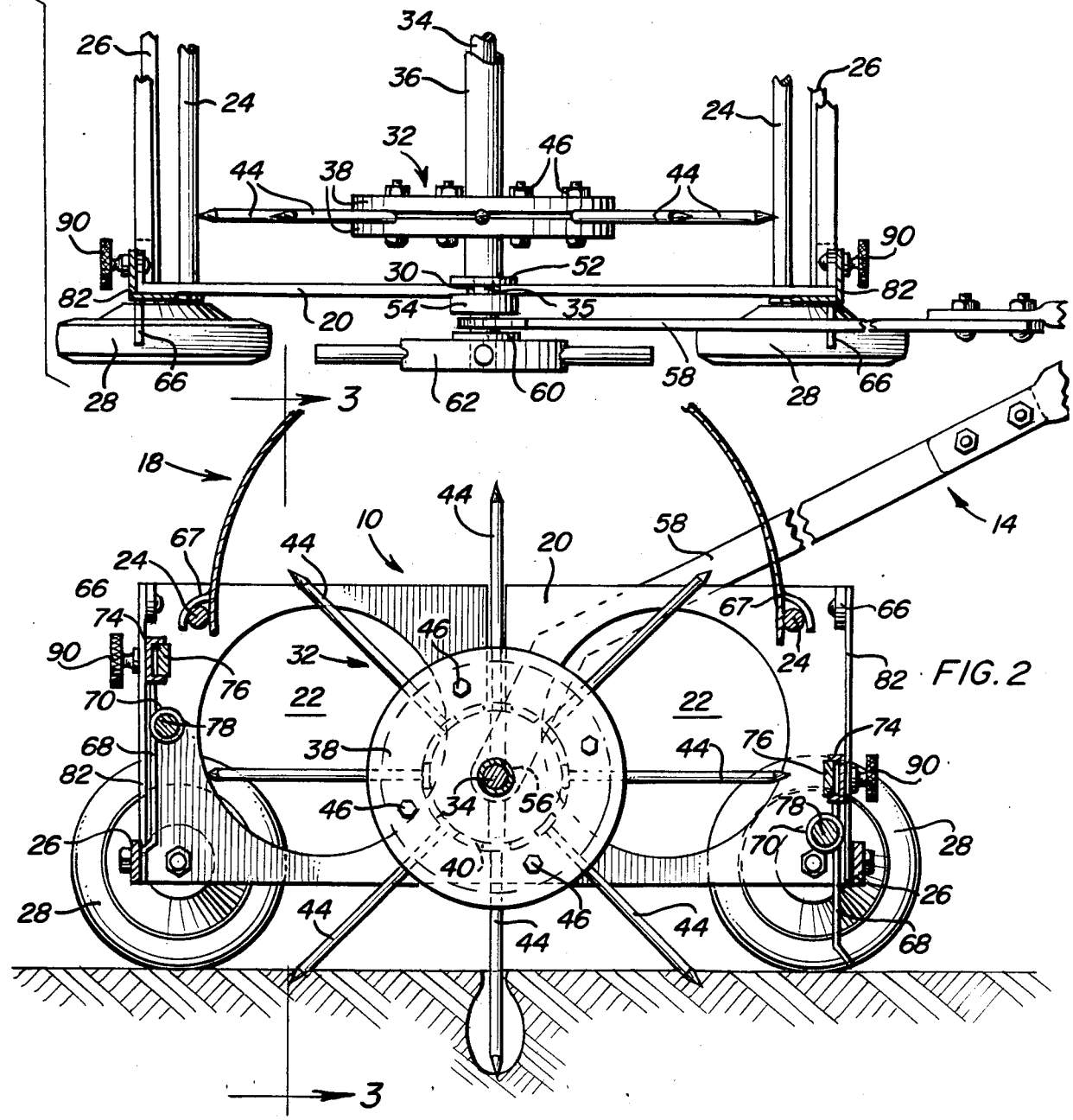
FIG. 2 is a sectional view on line 2—2 of FIG. 1.
Figure 3:
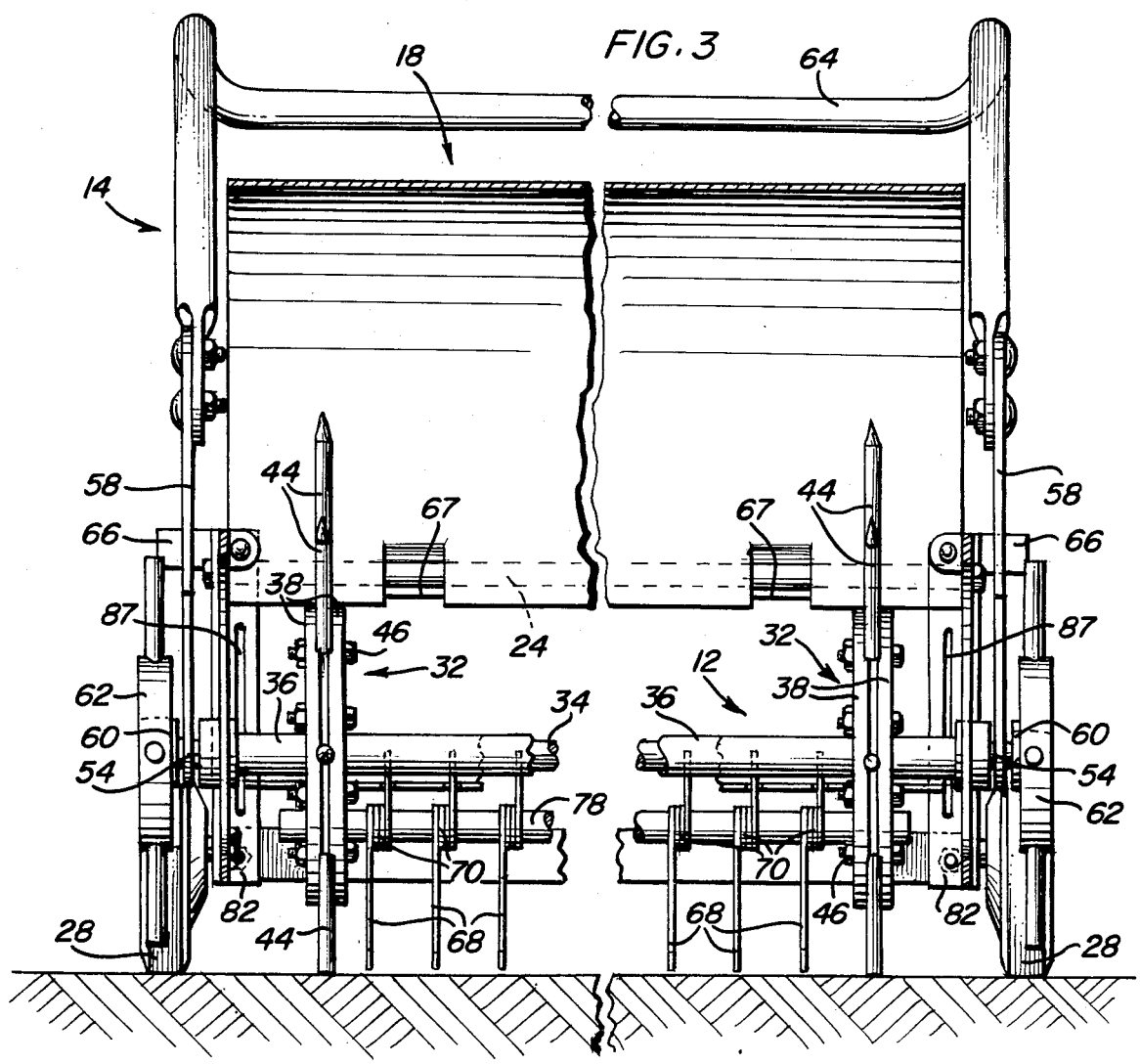
FIG. 3 is a sectional view on line 3—3 of FIG. 2.
Figure 4:
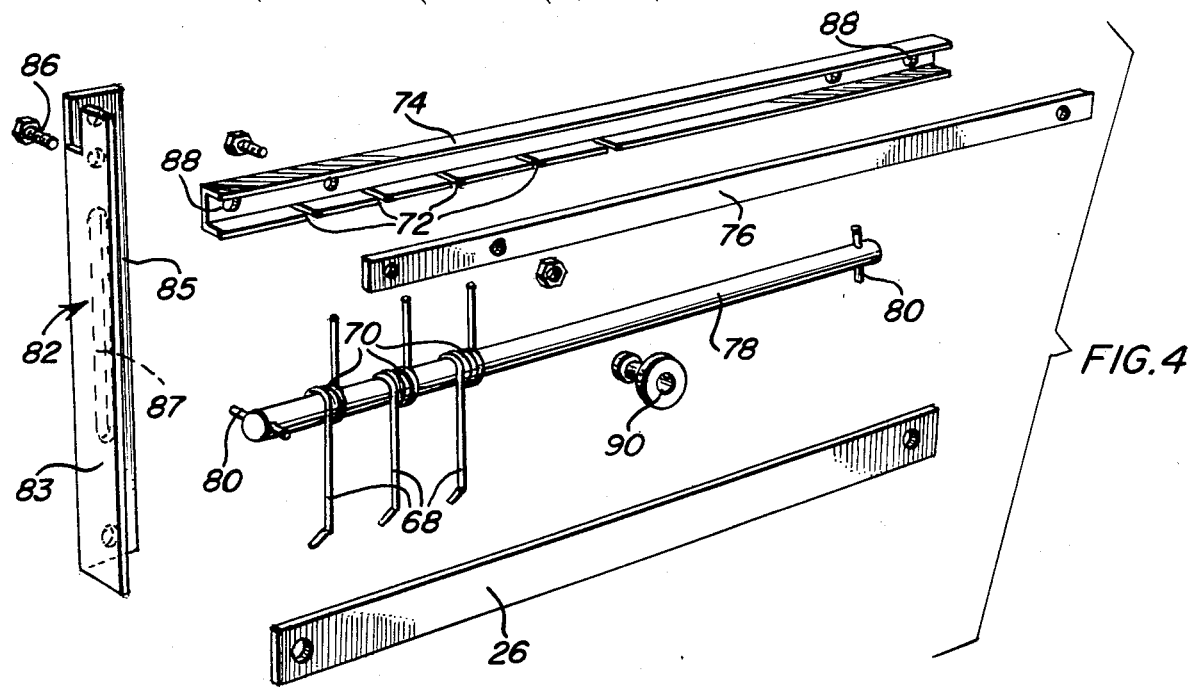
FIG. 4 is an exploded perspective view of a spring rake assembly for the soil perforator.

The perforator further comprises spring rake assemblies at the respective ends of frame 10, each spring rake assembly comprising a series of spring fingers 68 (see particularly FIG. 4) with central coils 70, the fingers being mounted at their upper ends in slots 72 formed in a channel 74, and being held in place by a bar 76 bolted into the channel. A rod 78 is inserted through the respective coils 70 to stabilize and align the fingers, the rod being retained by cotter pins 80. The spring rake assemblies are carried in vertical angle-section members 82 at the respective corners of frame 10, members 82 each having one flange 83 suitably secured to the respective frame plate 20, and the other flange 85 formed with an elongate slot 87 for mounting the respective rake assembly by means of bolts 86 extending through the slots and through openings 88 in channel 74. Thumb screws 90 tighten onto the bolts 86 whereby the spring rakes may be vertically adjusted in slots 87 into and out of ground engagement as shown in FIG. 2. The spring rakes may be used singly or in combination during forward and reverse movement of the perforator and may be useful, for example, in removing thatch or foreign matter in general from soil being perforated.

When pushing the perforator over the ground in the manner of a manual lawnmower, for example, with spikes 44 set to a suitable height to perforate sod, it is found that the lightweight construction of the spiked rotor provides effective soil perforation with no additional weight being required to provide the required perforating action of the spikes. However, when the aerator is towed in the opposite direction, for example, by hitching yoke 64 of the handle behind a riding mower or the like, it is found expedient to use weight box 16 and added weights as required, with the aerator. As seen in FIG. 5, the weight box has forwardly extended channel-section arms 92 with openings 94 and slots 96 at their forward ends. Arms 92 are adapted to fit over arms 58 of handle 14, resting on the outwardly pivoted latch elements 66, and slots 96 are hooked under pins 98 provided for the purpose on arms 58. Weights may be placed in box 16 appropriate to the type of soil being perforated, and by situating the added weight behind frame 10, less additional weight is required than if the weight were placed directly over the rotor spikes.

In manually pushing the aerator, the provision of frame 10 effectively controls and governs the penetration of the spikes facilitating an operator's task in pushing the device. Without frame 10, manually pushing a spiked unweighted rotor tends to cause too deep a penetration of the spikes making the rotor difficult to push.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A soil perforator comprising a wheeled frame, a spiked rotor for mounting on the frame in a manner enabling the rotor spikes to penetrate soil accompanied by rotation of the rotor when the frame is moved along the ground, and a handle for manually pushing the assembled frame and rotor along the ground, wherein the frame includes side plates with top-opening vertical slots defining means for vertically adjustably mounting the rotor in the frame, wherein the rotor includes a rotor shaft with end portions adapted to project outwardly through the slots, and means for releasably clamping the shaft in selected vertical position in the slots, wherein the handle has arms received on the end portions of the shaft, wherein the rotor comprises plural spiked disc assemblies freely rotatably mounted on the shaft and spacer means, separate from the disc assemblies, the spacer means being mounted on the shaft between the respective disc assemblies, the disc assemblies and spacer means being removable from the shaft upon removal of the rotor from said slots for enabling the number of assemblies on the shaft to be changed so as to vary the density of soil perforations formed by the perforator.

2. The invention of claim 1 including an arched cover for attachment to the frame over the rotor.

3. The invention of claim 1 wherein the rotor comprises plural spiked disc assemblies freely rotatably mounted on a rotor shaft carried by the frame with spacer means on the shaft between the respective disc assemblies.

4. The invention of claim 3 wherein the spiked disc assemblies and spacer means are removable from the shaft for enabling the number of assemblies on the shaft to be chagned so as to vary the density of soil perforations formed by the perforator.

5. The invention of claim 1 wherein the perforator further includes a weight box and means for attaching the weight box at the end of the frame opposite the handle.

6. The invention of claim 5 wherein the means for attaching the weight box includes a pair of weight box arms extending from the weight box for fitting over the handle arms, and interengageable latch elements between the respective arms.

7. The invention of claim 1 including a rake assembly at one end of the frame for raking the ground as the perforator is moved therealong.

8. A soil perforator comprising a wheeled frame, a spiked rotor for mounting on the frame in a manner enabling the rotor spikes to penetrate soil accompanied by rotation of the rotor when the frame is moved along the ground, and a handle for manually pushing the assembled frame and rotor along the ground, including a rake assembly at one end of the frame for raking the ground as the perforator is moved therealong, including guide means mounting the rake assembly on the frame for vertical adjusting movement of the rake assembly effective to move rake members of the assembly into and out of ground engagement.

9. A soil perforator comprising a wheeled frame, a spiked rotor for mounting on the frame in a manner enabling the rotor spikes to penetrate soil accompanied by rotation of the rotor when the frame is moved along the ground, and a handle for manually pushing the assembled frame and rotor along the ground, including a rake assembly at one end of the frame for raking the ground as the perforator is moved therealong, wherein the rake members comprise spring fingers each formed with a central coil, the fingers being secured at one end in an elongate holder extending transversely of the frame, and the assembly including a transverse rod, detached from the holder, extending through the respective coils for aligning and stabilizing the fingers.

10. The invention of claim 9 wherein the rake assembly is replicated at the other end of the frame.

11. A soil perforator comprising a wheeled frame, a spiked rotor for mounting on the frame in a manner enabling the rotor spikes to penetrate soil accompanied by rotation of the rotor when the frame is moved along the ground, and a handle for manually pushing the assembled frame and rotor along the ground, wherein the rotor comprises plural spiked disc assemblies freely rotatably mounted on a rotor shaft carried by the frame with separate spacer tubes freely inserted on the shaft between the respective disc assemblies, wherein the spiked disc assemblies and spacer means are removable from the shaft for enabling the number of assemblies on the shaft to be changed so as to vary the density of soil perforations formed by the perforator, and wherein each spiked disc assembly comprises a pair of discs, a plurality of spikes, and attachment means releasably connecting the discs together substantially face to face with the spikes trapped therebetween and projecting radially from between the discs.

12. The invention of claim 2 wherein the spikes have enlarged heads and the discs having facing surfaces each formed with radial grooves for receiving the respective spikes, the radial grooves radiating from a circular groove for receiving the spike heads.

* * * * *